United States Patent
Luan et al.

(10) Patent No.: US 10,739,758 B2
(45) Date of Patent: Aug. 11, 2020

(54) MODEL-FREE ONLINE RECURSIVE OPTIMIZATION METHOD FOR BATCH PROCESS BASED ON VARIABLE PERIOD DECOMPOSITION

(71) Applicant: Jiangnan University, Wuxi (CN)

(72) Inventors: Xiaoli Luan, Wuxi (CN); Zhiguo Wang, Wuxi (CN); Fei Liu, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 16/455,679

(22) Filed: Jun. 27, 2019

(65) Prior Publication Data

US 2019/0324427 A1 Oct. 24, 2019

Related U.S. Application Data

(62) Division of application No. 15/736,578, filed as application No. PCT/CN2015/096372 on Dec. 4, 2015, now abandoned.

(30) Foreign Application Priority Data

Nov. 26, 2015 (CN) .......................... 2015 1 0834481

(51) Int. Cl.
*G05B 19/4155* (2006.01)
*G05B 19/418* (2006.01)
*G05B 13/02* (2006.01)

(52) U.S. Cl.
CPC ....... *G05B 19/4155* (2013.01); *G05B 13/022* (2013.01); *G05B 19/4188* (2013.01); *G05B 2219/32015* (2013.01); *G05B 2219/32077* (2013.01); *G05B 2219/32287* (2013.01); *Y02P 90/02* (2015.11)

(58) Field of Classification Search
CPC ..................................................... G05B 13/02
See application file for complete search history.

(56) References Cited

U.S. PATENT DOCUMENTS

| | | | |
|---|---|---|---|
| 9,046,882 B2* | 6/2015 | Bartee | G05B 17/02 |
| 9,098,093 B2* | 8/2015 | Macharia | G06Q 30/0283 |
| 9,110,462 B2* | 8/2015 | Bourg, Jr. | G05B 19/41865 |
| 9,122,260 B2* | 9/2015 | Lou | G05B 13/04 |
| 9,134,711 B2* | 9/2015 | Bourg, Jr. | G05B 13/042 |
| 9,552,000 B2* | 1/2017 | Mills | G05B 19/41865 |
| 9,862,889 B2* | 1/2018 | Lucas | C10B 41/00 |

\* cited by examiner

*Primary Examiner* — Shogo Sasaki
(74) *Attorney, Agent, or Firm* — IPro, PLLC

(57) ABSTRACT

The present invention discloses a model-free online recursive optimization method for a batch process based on variable period decomposition. Variable operation data closely related to product quality is acquired, optimization action on each subset is integrated on the basis of time domain variable division on the process by utilizing a data driving method and a global optimization strategy is formed, based on which an online recursive error correction optimization strategy is implemented. According to the method, the online optimization strategy is formed completely based on the operation data of the batch process without needing prior knowledge or a model of a process mechanism. Meanwhile, the optimized operation locus line has better adaptability by using the online recursive correction strategy, and thus the anti-interference requirement of the actual industrial production is better met.

7 Claims, 6 Drawing Sheets

MODEL-FREE ONLINE RECURSIVE OPTIMIZATION METHOD FOR BATCH PROCESS BASED ON VARIABLE PERIOD DECOMPOSITION

TECHNICAL FIELD

The present invention belongs to the field of chemical process manufacturing industry, and relates to an operation locus line variable period decomposition model-free online recursive optimization method for a batch process, which is applicable to optimal operation locus line online optimization of batch reactors, batch rectifying towers, batch drying, batch fermentation, batch crystallization and other processes and systems operated by adopting batch modes.

BACKGROUND

A batch process refers to that in industrial practical production, operators usually start from a variety of control indicators to find out an operation curve for a specific batch process based on long-time accumulated experience. Such a method of seeking an operation curve by means of experience is laborious, time-consuming and difficult to standardize and popularize. Thus, it is necessary to carry out a simple and effective batch process optimization method to obtain more satisfying economic indicators. The optimization of the batch process is usually aimed at improving the quality or yield of a product to obtain an optimal operation locus line. Therefore, the study on the method of obtaining the optimal operation curve of the batch process is the key to solve the problem.

The most common method of obtaining the optimal operation curve is a model-based offline optimization method, which is to offline solve the optimization problem based on a process model. However, the offline optimization is only applicable to an ideal model, and when uncertainties and disturbances in the process model affect the real-time operation of a system, the obtained locus line will no longer be optimal. At the same time, operation strategies and operation conditions of the process are required to be updated in real time by the change of a feedstock during operation, switching of products and raw materials and start/stop of the production process. Therefore, it is an important topic in the process industry to study the online real-time optimization method and technology for the batch process.

There have been many successful industrial application cases on real-time optimization based on a continuous process, whereas for the online real-time optimization technology for a batch process, there is still a lack of relatively general effective method suitable for industrial application. Therefore, it is extremely urgent to put forward a batch process online real-time optimization strategy and an implementation framework, which are relatively general and can solve real industrial problems to promote the industrialized process of online real-time optimization of the batch process, so as to provide a new method for solving the control problem in the field of practical production.

SUMMARY

The present invention relates to a variable period decomposition model-free online recursive optimization method for a batch process. Variable operation data closely related to product quality is acquired, optimization action on each subset is integrated on the basis of time domain variable division on the process by utilizing a data driving method and a global optimization strategy is formed, based on which online recursive minimum error correction of the optimization strategy is implemented.

In order to fulfill the above purpose, the present invention adopts the following technical solution.

A data driven online recursive optimization method for variable period decomposition of a batch process is completely based on operation data of a production process, and does not need prior knowledge or a mechanism model of a process mechanism.

The steps of the present invention are divided into two parts. The first part refers to offline data acquisition and establishment of a basic optimization strategy; and the second part refers to an online recursive error correction implementation method.

The offline data acquisition and basic optimization strategy step is as follows.

Step 1: For operating a complete batch process, variables to be optimized and final quality or yield indicators are acquired in batches. The acquisition time intervals of data may be equal time intervals or unequal time intervals, and within one time interval, the to-be-optimized variable of the process does not have a significant change or have a significant impact on the final quality or yield indicator. Generally, 30-50 batches of effective data are required.

Step 2: For the acquired data, principal component analysis is performed on the variables in batches, and singular points are removed from a principal component mode diagram, so as to enable all data points to be within one degree of credibility.

Step 3: Equal interval division or unequal interval division is performed on the remaining data after the singular points are removed on a time axis.

Step 4: Each batch of data included in each interval is expressed as a continuous variable, and these variables are referred to as decomposed period variables. The value of the period variable is composed of each batch of data of the variable to be optimized within a specific time interval.

Step 5: Each corresponding batch quality or yield indicator in step 4 is referred to as an indicator variable. A value of the indicator variable is a continuous variable formed by the final quality or yield of each batch.

Step 6: The period variables and the indicator variables formed in step 4 and step 5 are combined to form a combined data matrix of the period variables and the indicator variables.

Step 7: Principal component analysis is performed on the above-mentioned combined matrix to form a principal component load diagram.

Step 8: The action directions and magnitudes of the period variables on the indicator variables are classified for the principal component load diagram in step 7. They are classified into positive action, reverse action and no (micro) action.

Step 9: An optimization strategy for each period variable is calculated according to the following perturbation formula:

$$J(i)=M(i)+\text{sign}(i)\times 3\sigma(i)$$

wherein $J(i)$, $M(i)$ and $\sigma(i)$ herein are respectively optimization target value, mean value and standard deviation of the ith period variable; and sign(i) is a cosine symbol of an included angle formed by the ith period variable and the indicator variable. The sign(i) is +1 when the included angle is smaller than 90 degrees, −1 when the included angle is greater than 90 degrees, and 0 when the included angle is equal to 90 degrees.

Step 10: The optimization target values of all periods obtained in step 9 constitute a basic optimization variable curve for the whole batch process according to a period sequence i=1, 2, . . . , N.

Step 11: The optimization variable curve is usually digitally filtered, so that the new optimization curve is relatively smooth and facilitates tracking control.

In order to overcome dynamic control deviation and uncontrollable random disturbance, when the basic optimization control variable locus obtained by the above steps is put into practical application, online recursive error correction is performed on the basic optimization strategy at each time period.

The online recursive error correction steps are as follows.

Step 12: In the (i−1)th time period, the error of the offline basic optimization target value J(i−1) and the actual measured value RV(i−1) is calculated:

$$E(i-1)=J(i-1)-RV(i-1)$$

Step 13: On the offline basic optimization strategy, a new optimization target value of next period is constituted:

$$J_o(i)=J(i)+E(i-1)$$

Step 12 and step 13 are sequentially calculated according to the period sequence i=1, 2, . . . , N and applied to the process, till the operation of the whole batch process is over.

More generally, in step 12, an error sequence can be formed by using the errors of a plurality of past periods, the error sequence is digitally filtered, and the filtered prediction value is applied to the optimization strategy of the current period.

According to the present invention, variable operation data closely related to product quality is acquired, optimization action on each subset is integrated on the basis of time domain variable division on the process by utilizing a data driving method and a global optimization strategy is formed, based on which online recursive minimum error correction of an optimization strategy is implemented. According to the method of the present invention, the online optimization strategy is formed completely based on the operation data of the batch process without needing prior knowledge or a model of a process mechanism. Meanwhile, the optimized operation locus line has better adaptability by using the online recursive correction strategy, and thus the anti-interference requirement of the actual industrial production is better met.

DETAILED DESCRIPTION

A batch crystallization process is taken as the example, and the method does not limit the scope of the present invention.

This implementation method is divided into four parts. The first part is data acquisition and preprocessing. The second part is construction of a combined data matrix. The third part is calculation of a basic optimization strategy. The fourth part is establishment of a recursive error correction online optimization strategy.

Figure 8:
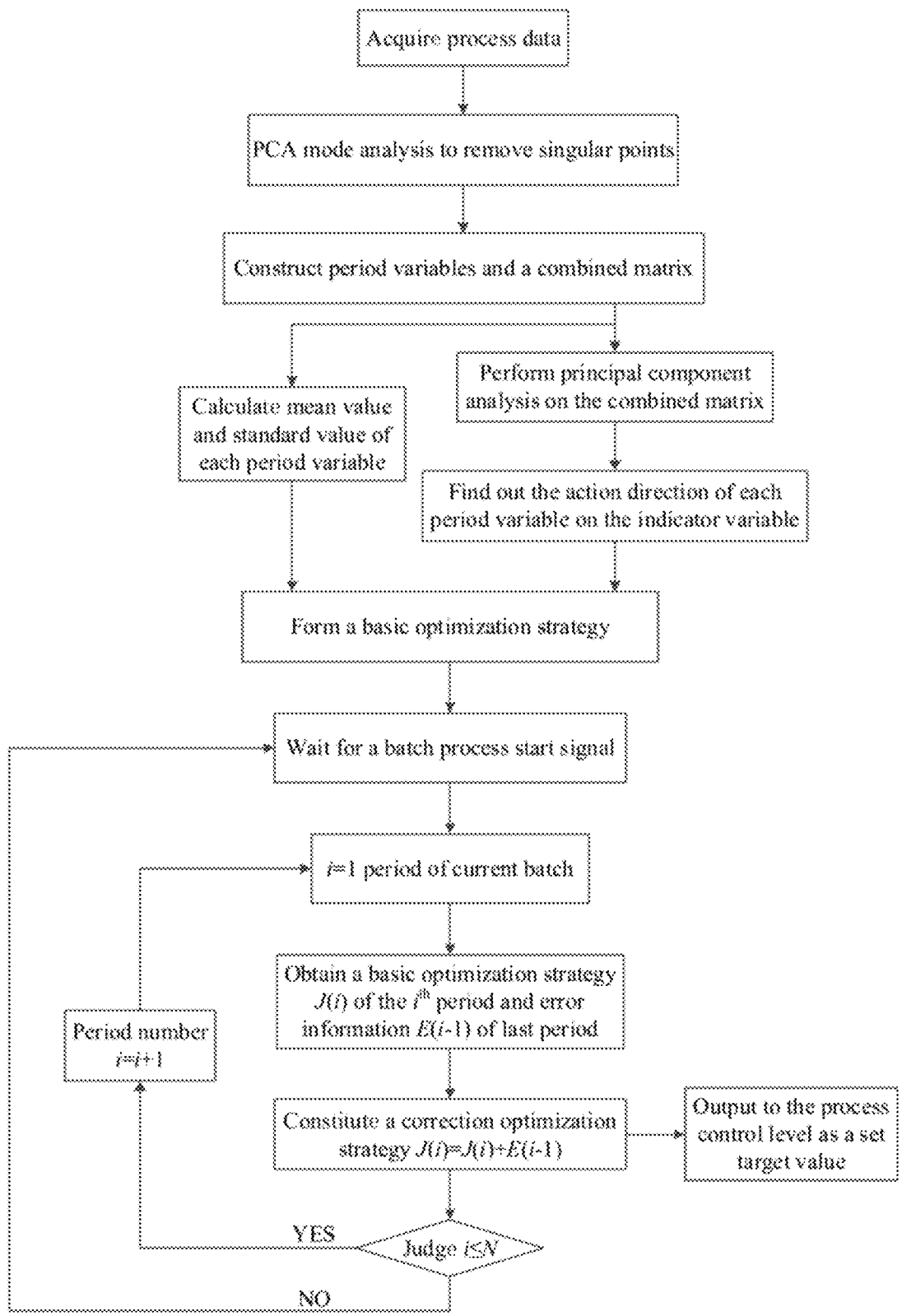
FIG. 8 is a block diagram of implementation steps of the present invention.

The block diagram of the implementation steps of the present method is shown as FIG. 8, and the specific implementation steps and algorithms are as follows.

Figure 1:
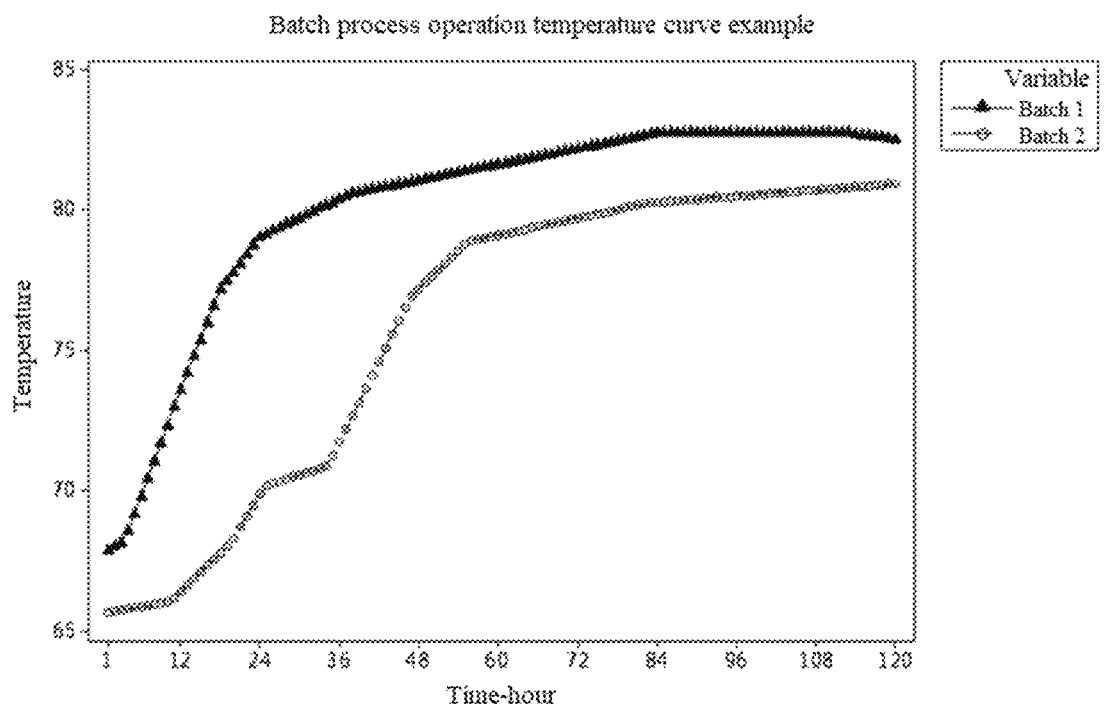
FIG. 1 is a temperature curve example of a batch process.

Step 1: For operating a complete batch crystallization process, operation temperature closely related to product yield is selected as a variable to be optimized, and 50 groups of temperature variables and final yield indicator data are acquired in batches. The acquisition time interval of the data is 1 minute. FIG. 1 is a temperature curve data acquisition example of a batch crystallization process, and for the sake of clarity, only the temperature curves of 2 batches are drawn in the figure.

Figure 2:
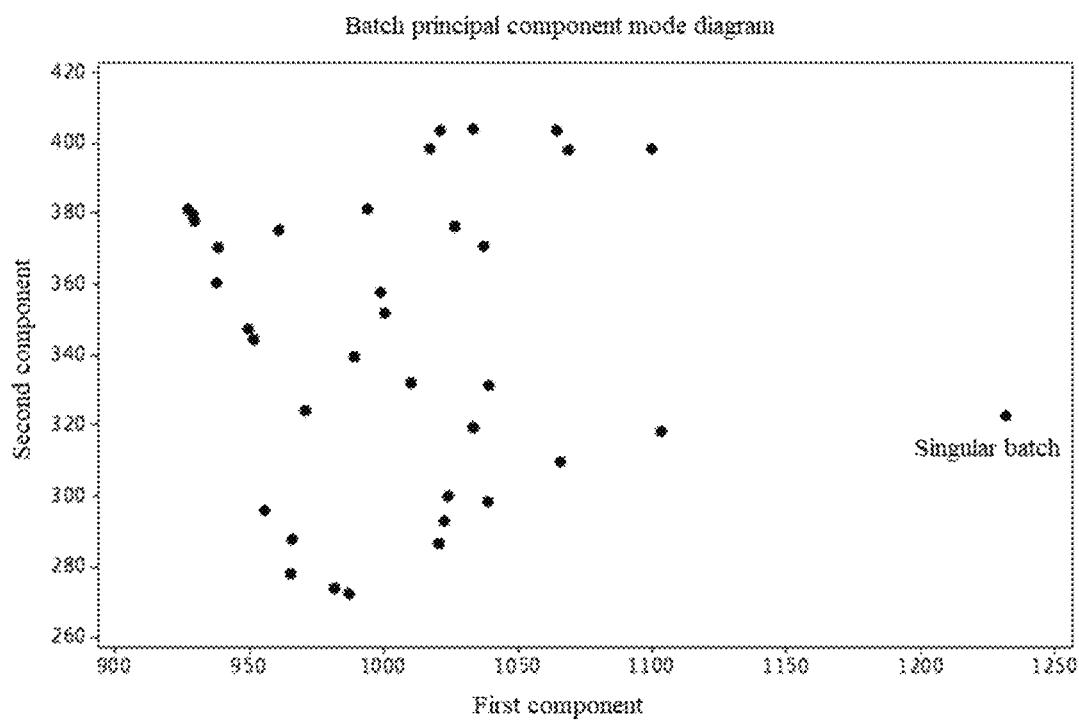
FIG. 2 is a principal component mode diagram indicating that the temperature of a batch process is an optimization variable.

Step 2: For all the acquired 50 batches of temperature data, principal component analysis is performed on the temperature variables in batches, and singular points are removed from a principal component mode diagram, so that all data points are within one degree of credibility. FIG. 2 is a principal component mode diagram indicating that the temperature of a batch process is an optimization variable, and it can be seen from the figure that a batch of temperature data on the right is greatly different from the overall data mode and thus should be removed.

Figure 3:
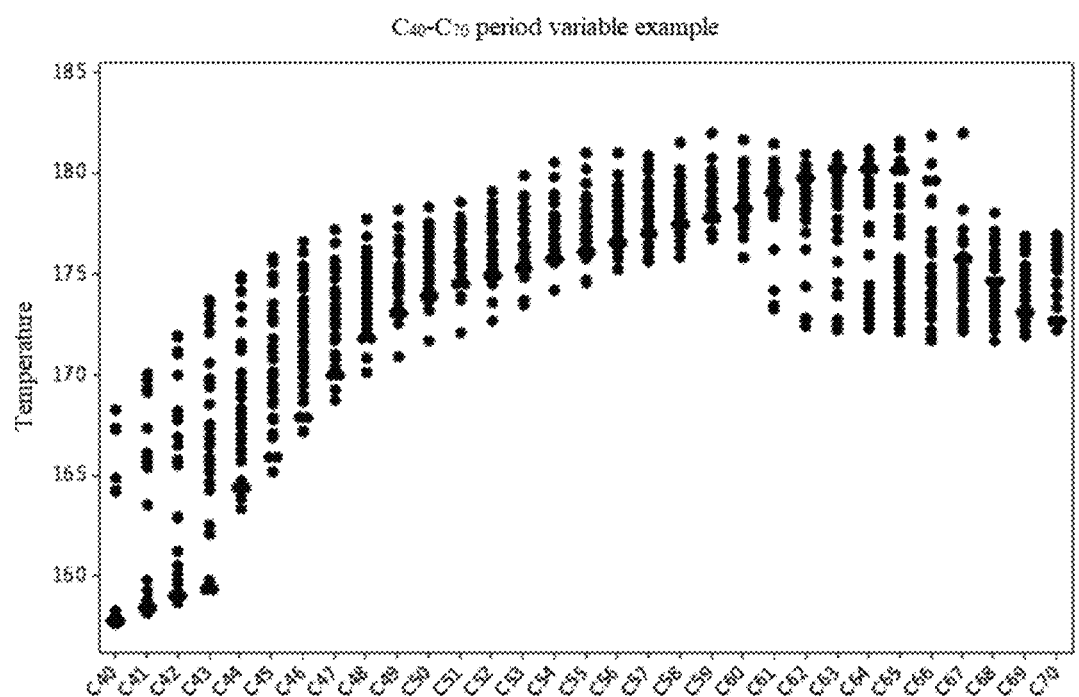
FIG. 3 is a composition diagram of period variables.

Step 3: The remaining 49 batches of temperature data are divided into 300 periods at equal intervals on a time axis to constitute 300 period variables C1, C2, . . . , C300. For the sake of clarity, FIG. 3 shows C40 to C70 period variables.

Step 4: Each corresponding batch of yield indicator data in step 3 forms an indicator variable Q.

Step 5: The 300 period variables C1, C2, . . . , C300 and one indicator variable Q formed in step 3 and step 4 are combined to generate a 49×301-dimensional combined data matrix L.

Figure 4:
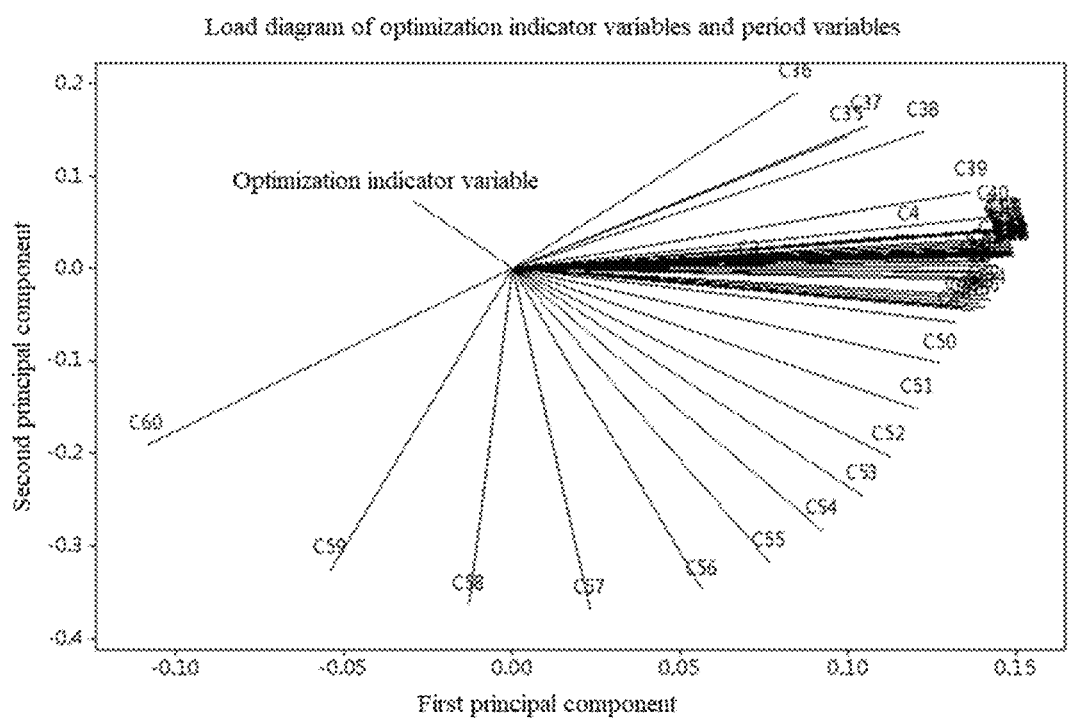
FIG. 4 is a principal component load diagram of period variables and indicator variables.

Step 6: Principal component analysis is performed on the combined matrix L to form a principal component load diagram. For the sake of clarity, FIG. 4 shows a principal component load diagram example generated by combining 25 period variables C36 to C60 and the indicator variable Q.

Figure 5:
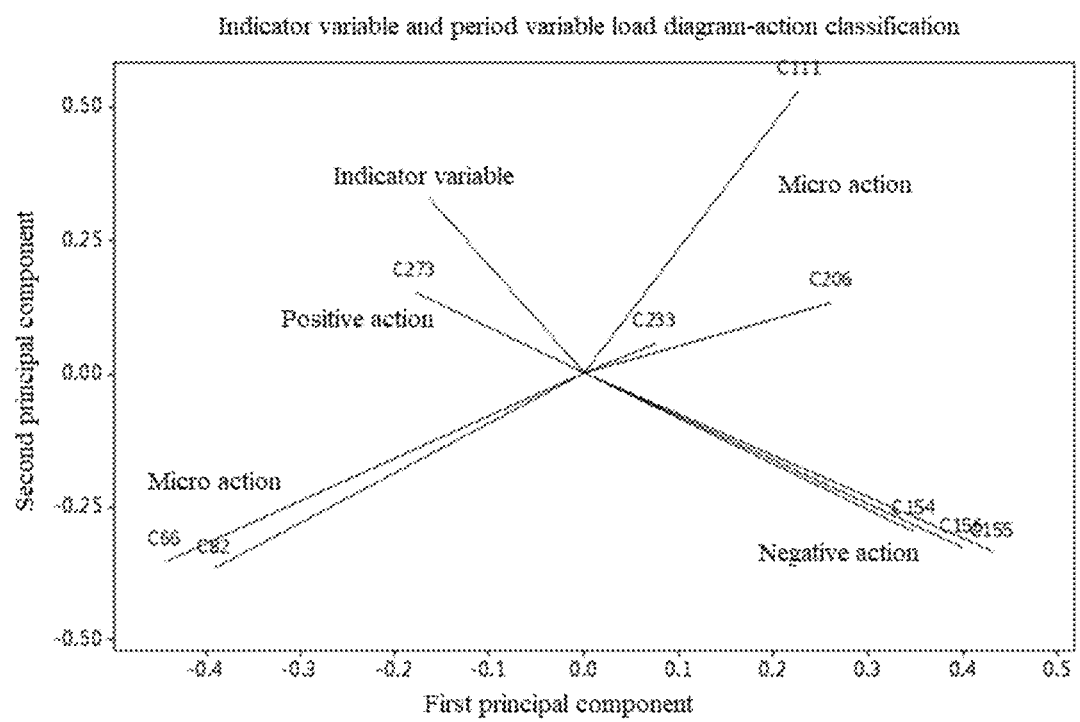
FIG. 5 is an action classification diagram of the period variables on the indicator variables.

Step 7: The action directions and magnitudes of the period variables on the indicator variable are classified for the principal component load diagram in step 6. FIG. 5 is a classification example, it can be seen from FIG. 5 that the actions of C154, C155, C156 and C273 on the indicator variable Q are maximum, wherein C154, C155 and C156 are reverse actions, and C273 is a positive action. C66, C111 and the like having an included angle of about 90 degrees with the indicator variable Q in the directions nearly do not act on the indicator variable Q.

Step 8: Mean value and standard deviation of each period variable are calculated respectively. For example, the mean value of C154 having a reverse action on the indicator variable Q is 134.58 DEG C., and the standard deviation is 6.08 DEG C.

Step 9: The optimization target value of the ith period variable is acquired according to the following perturbation calculation formula:

$$J(i)=M(i)+\text{sign}(i)\times 3\sigma(i)$$

wherein J(i), M(i) and σ(i) herein are respectively optimization target value, mean value and standard deviation of the ith period variable; and sign(i) is a cosine symbol of an included angle formed by the ith period variable and the indicator variable. On the classification diagram of FIG. 5, the sign(i) is +1 when the included angle is smaller than 90 degrees, −1 when the included angle is greater than 90 degrees, and 0 when the included angle is equal to 90 degrees.

Step 10: The optimization target values of all periods obtained in step 9 constitute a basic optimization variable curve according to a period sequence i=1, 2, . . . , 300.

Figure 6:
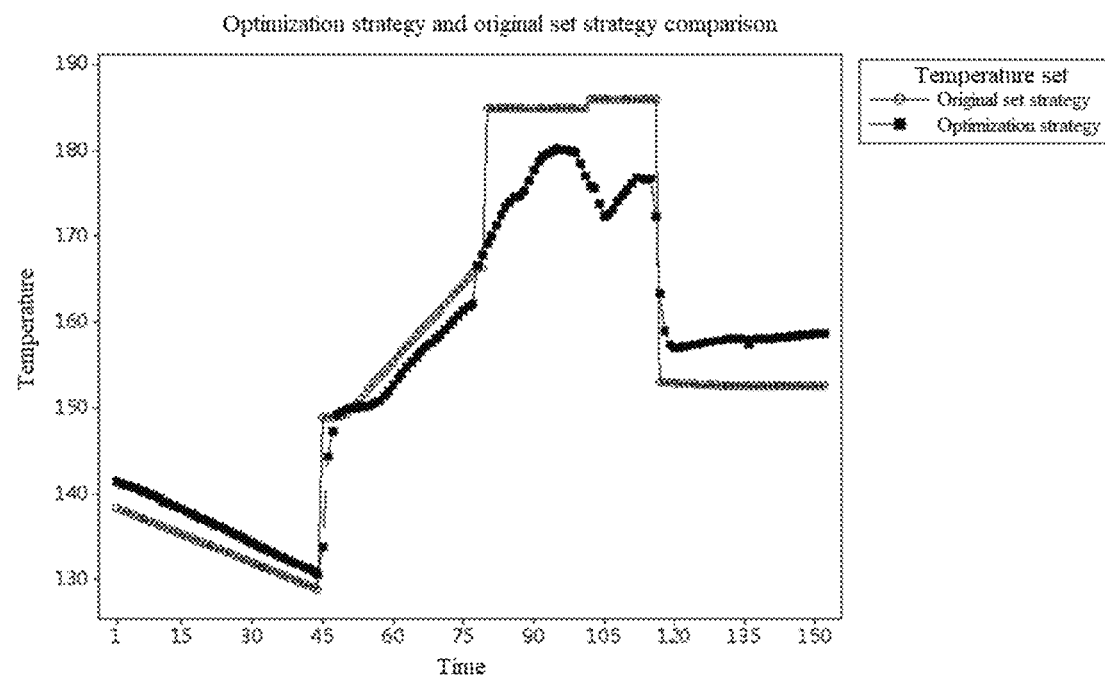
FIG. 6 is a comparison diagram of an optimized temperature curve and an original temperature curve of a batch process.
Figure 9:
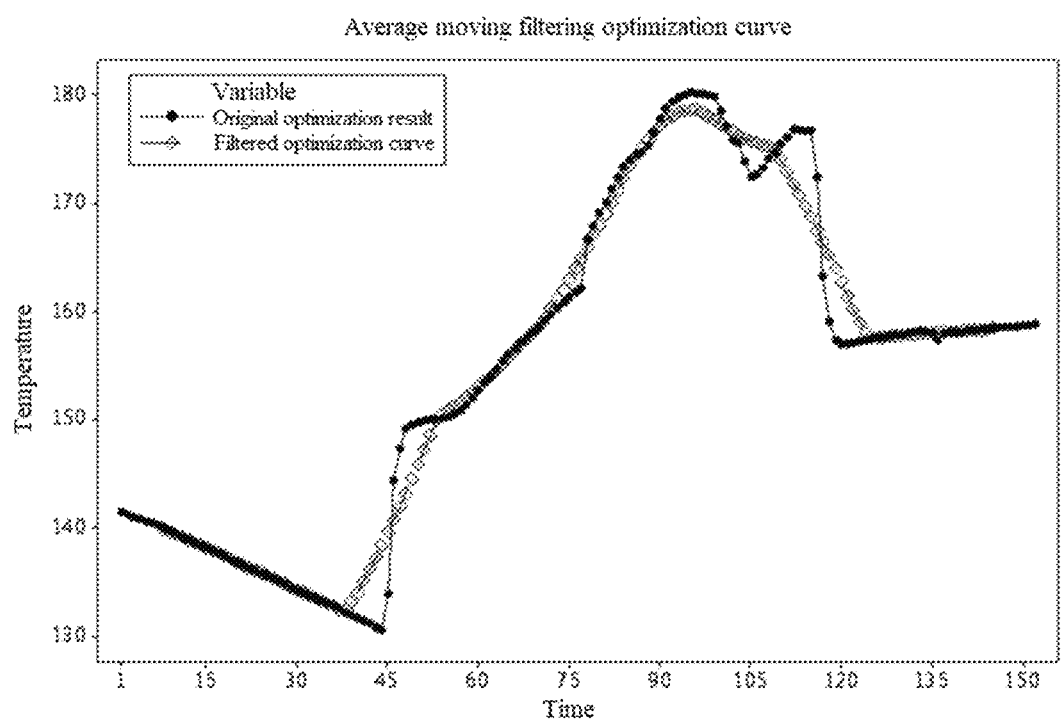
FIG. 9 shows an optimized curve after moving average filtering and an original optimized curve.

Step 11: Moving average filtering is performed on the basic optimization curve, so that the filtered optimization curve is relatively smooth and facilitates later tracking control design. FIG. 6 is a comparison of the optimized temperature curve and the original temperature curve, and FIG. 9 shows an optimization curve after moving average filtering and an original optimization curve. It can be seen from FIG. 9 that the filtered optimization curve is smoother and facilitates implementation of a tracking controller.

Step 12: When the basic optimization control locus obtained by the above series of steps is used on line, recursive error correction is performed in each time period:

(1) for the (i−1)th time period, the error of the offline basic optimization target value J(i−1) and the actual measured value RV(i−1) is calculated:

$$E(i-1)=J(i-1)-RV(i-1).$$

(2) on the offline basic optimization strategy, a new optimization target value of next period is constituted:

$$J_o(i)=J(i)+E(i-1).$$

Figure 7:
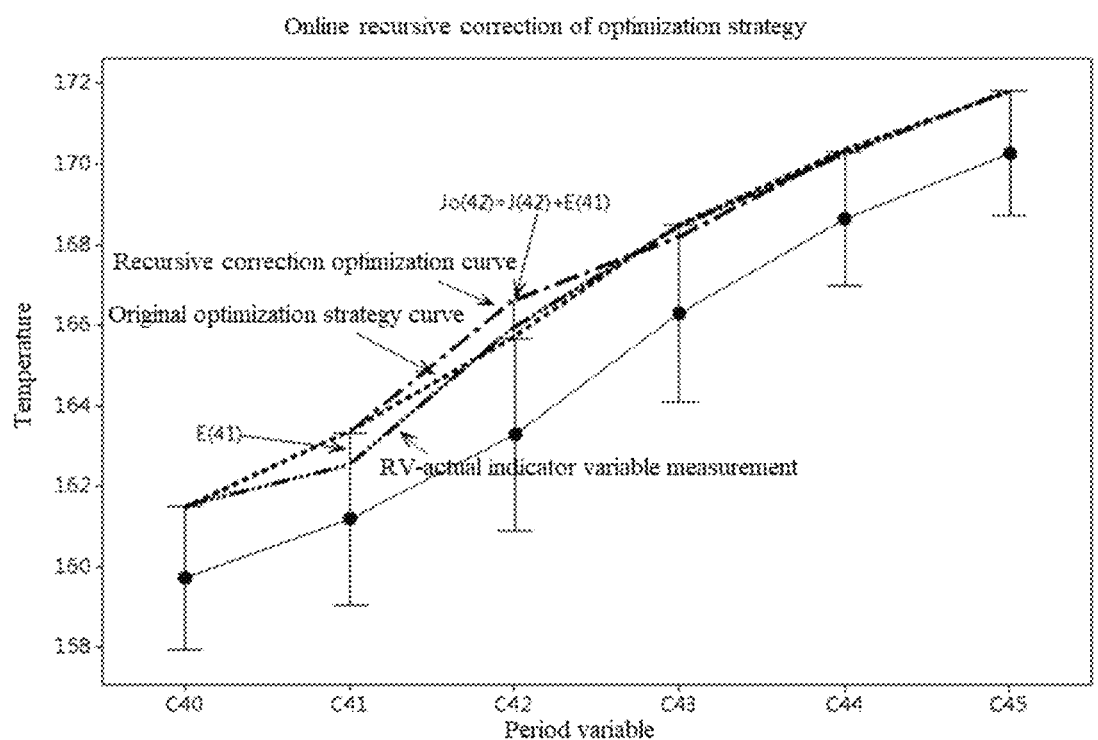
FIG. 7 is a generation diagram of an online recursive error correction strategy.

Step 12 is sequentially calculated according to the period sequence i=1, 2, . . . , 300, till the operation of the whole batch process is over. FIG. 7 is a generation calculation schematic diagram of an online recursive error correction strategy.

Figure 10:
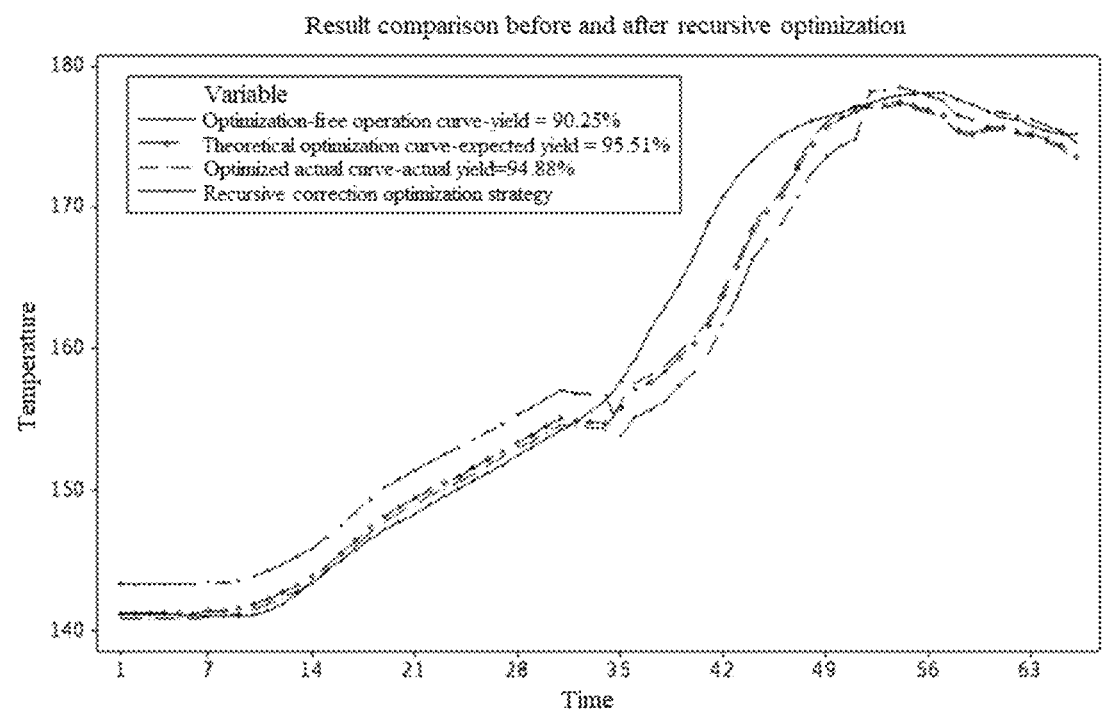
FIG. 10 is an optimization result (partial) diagram of a batch crystallization process.

FIG. 10 is an optimization result example of a batch crystallization process. It can be seen from the result in the figure that the optimization-free yield is 90.25%, whereas under the recursive correction optimization strategy, the actual operation yield is 94.88% and is substantially close to the theoretical optimal yield 95.51%. This result shows the effectiveness and practicability of the method of the present invention.

While the present invention has been described in some detail for purposes of clarity and understanding, one skilled in the art will appreciate that various changes in form and detail can be made without departing from the true scope of the invention. All figures, tables, appendices, patents, patent applications and publications, referred to above, are hereby incorporated by reference.

What is claimed is:

1. A method of performing a batch reaction in a reactor, the batch reaction comprising N time periods, N being an integer larger than one, the method comprising:
for i-th time period of the N time periods, i=2, . . . , N, determining, using a computer, a target value $J_0(i)$ of a temperature in the reactor as a sum of:
a difference E(i−1) between a reference value J(i−1) of the temperature for (i−1)-th time period and an actual value RV(i−1) of the temperature in the (i−1)-th time period, and
a reference value J(i) of the temperature for the i-th time period;
controlling the reactor so that the temperature in the i-th time period is at the target value $J_0(i)$.

2. The method of claim 1, further comprising, for k-th time period of the N time periods, k=1, . . . , N, determining the reference value J(k), without using a model characterizing the batch reaction.

3. The method of claim 1, wherein the N time periods have the same length.

4. The method of claim 1, further comprising, for k-th time period of the N time periods, k=1, . . . , N, determining the reference value J(k) by:
measuring actual values AV(m, k) of the temperature in the k-th time period and an actual value of yield Q(m) of the batch reaction, in m-th run among M actual runs of the batch reaction, m=1, . . . , M;
determining the reference value J(k) based on one or more statistical parameters of AV(m, k), m=1, . . . , M.

5. The method of claim 4, further comprising removing actual values AV(m, k) measured in one of the M actual runs by performing a principal component analysis on the actual values AV(m, k) with respect to m.

6. The method of claim 4, wherein determining the reference value J(k) based on the one or more statistical parameters of AV(m, k), m=1, . . . , M, comprises computing the reference value J(k) as M(k)+sign(k)×3σ(k), wherein M(k) is the mean value of AV(m, k), m=1, . . . , M, wherein σ(k) is the standard deviation of AV(m, k), m=1, . . . , M, and wherein sign(k) has values 1, −1 and 0 respectively when AV(m, k) and Q(m), m=1, . . . , M, have a positive correlation, a negative correlation and no correlation.

7. The method of claim 4, further comprising smoothing J(k) with respect to k.

* * * * *